(12) United States Patent
Francia

(10) Patent No.: US 6,279,457 B1
(45) Date of Patent: Aug. 28, 2001

(54) FERMENTATION TANK, PARTICULARLY FOR MAKING RED WINE

(75) Inventor: Marco Francia, Casale Monferrato (IT)

(73) Assignee: Gimar Tecno S.R.L., Allessandra (IT)

( * ) Notice: Subject to any disclaimer, the term of this patent is extended or adjusted under 35 U.S.C. 154(b) by 0 days.

(21) Appl. No.: 09/538,973

(22) Filed: Mar. 31, 2000

(30) Foreign Application Priority Data

Apr. 1, 1999 (IT) .............................................. TO99A0254

(51) Int. Cl.$^7$ .................................................. C12G 1/032
(52) U.S. Cl. ............................................. 99/277.1; 99/277
(58) Field of Search ............................... 99/277.1, 277.2, 99/277, 276

(56) References Cited

U.S. PATENT DOCUMENTS 4,969,391 * 11/1990 Haulot ................................. 99/277.1

FOREIGN PATENT DOCUMENTS

| 2 405 300 | 10/1978 | (FR) | .................................. C12G/1/00 |
| 2489837 | * 3/1981 | (FR) | .................................. 99/277.1 |
| 2489709 | * 3/1982 | (FR) | .................................. 99/277.1 |
| 2767531 | 6/1997 | (FR) | . |
| 2767532 | 8/1998 | (FR) | . |

* cited by examiner

Primary Examiner—Reginald L. Alexander
(74) Attorney, Agent, or Firm—Sughrue, Mion, Zinn, Macpeak & Seas, PLLC

(57) ABSTRACT

A fermentation tank particularly for plants for making red wine is described and comprises a main tank for holding the must, an upper tank disposed above the main tank, apparatus for periodically supplying a portion of the must from the bottom of the main tank to the upper tank, valve apparatus defining, with the base of the upper tank, an out-flow aperture the size of which is variable between a closed position and a fully-open position and which can discharge the must from the upper tank to the main tank so as to spray the layer of marc floating on the must held in the main tank, and actuator apparatus associated with the valve apparatus for the opening and closure thereof; the actuator apparatus comprise an electromagnetically operated actuator, a control and operating unit optionally being provided and arranged to define, by way of the actuator apparatus, the position of the valve apparatus and/or the rules governing the opening/closure movement thereof.

9 Claims, 2 Drawing Sheets

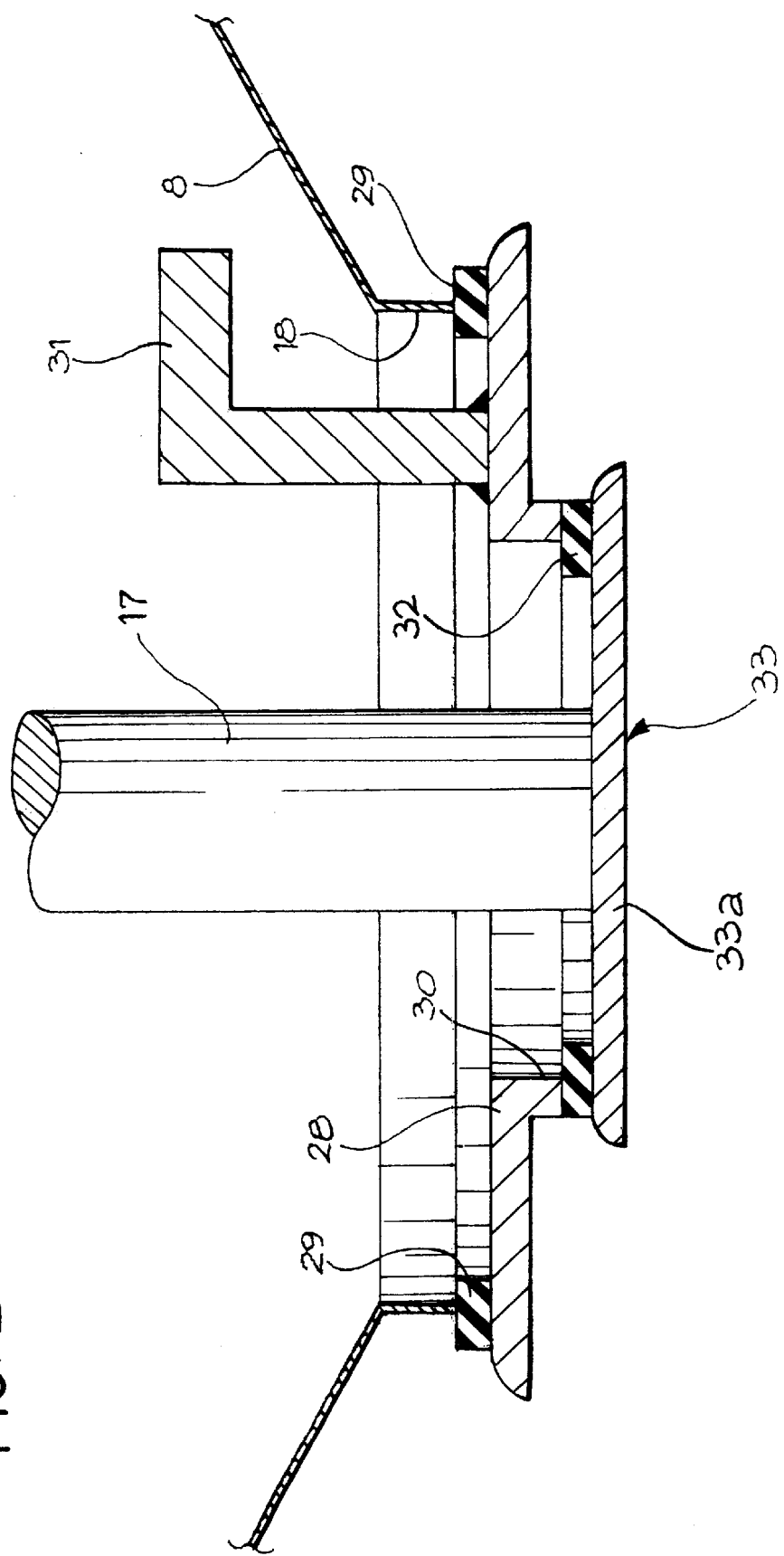

FERMENTATION TANK, PARTICULARLY FOR MAKING RED WINE

DESCRIPTION

Figure 1:
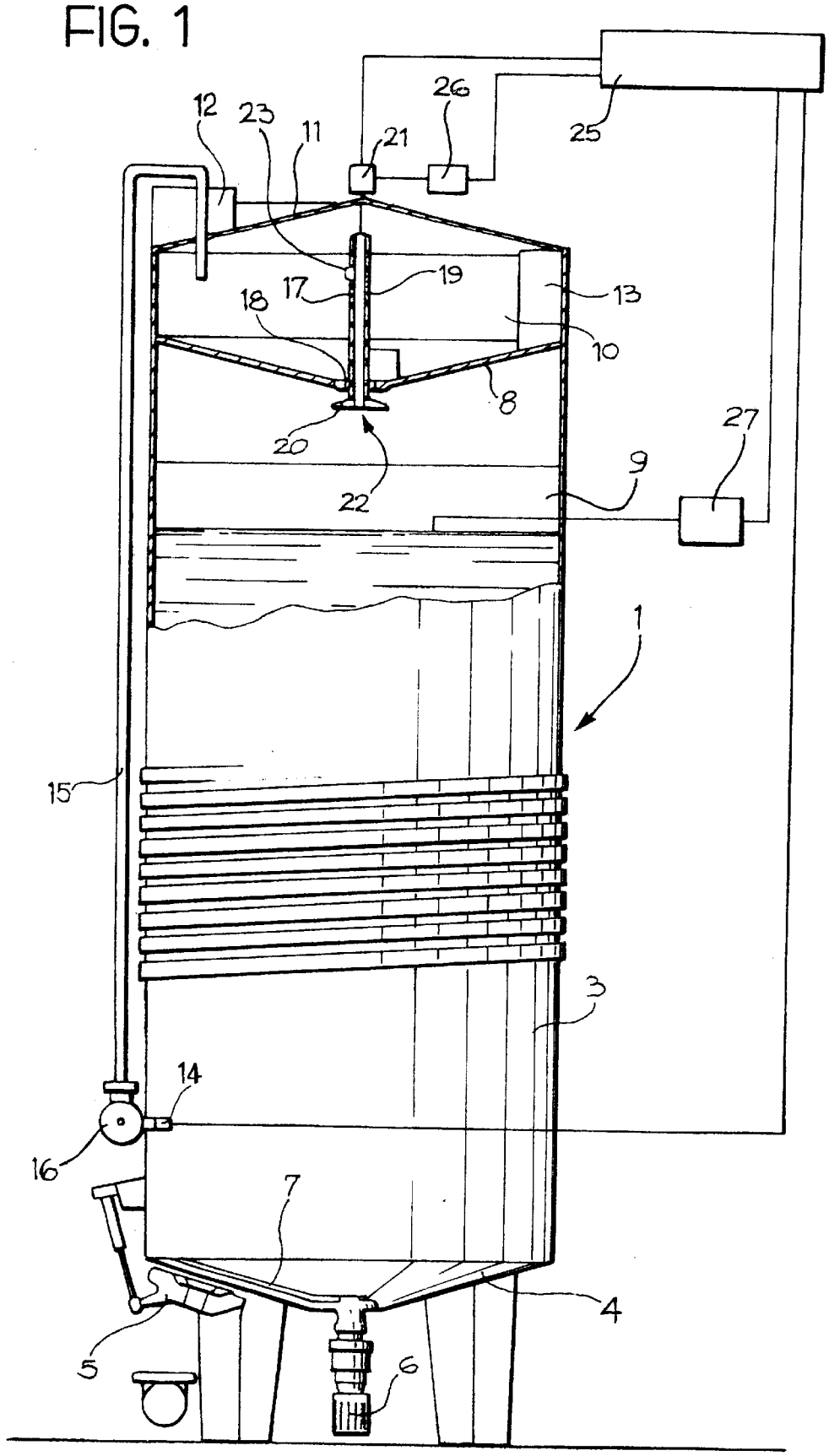

The present invention relates to automatic fermentation tanks, particularly for making red wine.

In particular, the invention relates to a fermentation tank of the type comprising a main tank for holding the must, an upper tank disposed above the main tank, means for periodically supplying a portion of the must from the bottom of the main tank to the upper tank, valve means defining, with the base of the upper tank, an out-flow aperture the size of which is variable between a closed position and a fully-open position and which can discharge the must from the upper tank to the main tank so as to spray the layer of marc (typically called the hat) floating on the must held in the main tank, and actuator means associated with the valve means for the opening and closure thereof.

In known fermentation tanks, the valve means comprise a rod closure element with a plate and the actuator means comprise a pneumatic piston arranged to move the closure element with a reciprocating linear motion between the open and closed positions or between predetermined open positions.

The subject of the present invention is an improvement to known fermentation tanks directed particularly towards the object of improving the spraying of the hat of marc in the course of the fermentation process.

Another object of the invention is to provide a fermentation tank which has a lower production cost, at the same time improving its operative flexibility, enabling the spraying and the wetting of the hat to be varied or modulated in dependence on the conditions which arise in the course of fermentation.

In view of these objects, the subject of the invention is a fermentation tank of the type mentioned above, characterized in that the actuator means associated with the valve means comprise an electrically operated actuator, a control and operating unit also optionally being provided and arranged to define, by means of the actuator means, the position of the valve means and/or the rules governing the opening/closure movement thereof.

The electrically operated actuator may comprise devices driven directly or indirectly (by means of mechanical transmissions) by direct-current or alternating-current motors, solenoids, electromagnets, or the like.

In a preferred embodiment, the fermentation tank also comprises a position detector or encoder which cooperates with the actuator means in order to send a signal representative of the position of the valve means to the control and operating unit, the control and operating unit being arranged to operate the actuator means in dependence on the signal received.

By virtue of the use of an electromagnetically operated actuator, the opening position of the valve means can be defined precisely and the speed of the movement of the valve means between predetermined opening positions or between the fully-open position and the closed position can also be regulated; since the area of the aperture for the out-flow of the liquid from the upper tank to the main tank varies in dependence on the opening position of the valve means, it is consequently possible to vary the flow-rate and the configuration, particularly the size, of the jet sprayed onto the hat of marc; moreover, the head of liquid in the upper tank varies according to the speed of the opening travel of the valve means and it is therefore also possible to vary the spraying flow-rate.

Further characteristics and advantages of the invention will become clear from the following detailed description, given with reference to the appended drawings, in which:

FIG. 1 is a partially-sectioned front view of a fermentation tank for wine-making plants according to the invention, and FIG. 2 is a view showing, in section, an embodiment of the valve means associated with the upper tank.

With reference to the drawings, a must fermentation tank is generally indicated 1. The tank 1, which has a circular cross-section, comprises a side wall 3 and a base 4 having a discharge opening with which a closure and discharge door 5 is associated.

A motor, indicated 6, drives, by means of a reduction unit, an internal extractor arm 7 for discharging the solids upon completion of the wine-making cycle. A separator element, indicated 8, fixed to the inside of the upper wall of the tank 1, divides the tank into two chambers, a lower chamber 9 constituting the main tank, and an upper chamber 10, disposed above the main tank, having an upper cover 11, and communicating with the atmosphere through a flue 12. The separator 8, which constitutes the base wall of the tank 10, communicates with the main tank 9 by means of an overflow pipe 13.

The liquid is supplied from the main tank 9 to the upper tank 10 by means of an intake duct 14 communicating with the lower portion of the tank 9 and by means of a delivery duct 15, between which a pump 16, controlled by a timer or by a control and operating unit 25, is interposed.

The upper tank 10 has a bottom valve having a closure device 17 which engages a central opening 18 in the base 8. In the embodiment shown, the closure device comprises a rod 19 coaxial with the fermentation tank 1 and a plate 20 or similar closure element which extends in the main tank 1 beneath the base 8.

In its open position, the plate 20 defines, with the base of the upper tank 10, an aperture for the out-flow of the liquid; the rod 19 is connected at the top to an electromagnetically operated actuator 21 which is operated by the control and operating unit 25; in the simplest embodiment, the control and operating unit 25 may be a timer. The electromagnetically operated actuator 21 may be a cylinder driven by a direct-current electric motor.

The actuator 21 is arranged to move the closure device with a reciprocating rectilinear motion between predetermined positions of its travel so as correspondingly to vary the area of the aperture for the out-flow of the liquid from the upper tank 10 to the main tank 9.

The actuator 21 may preferably be associated with a position detector or encoder which can send to the unit 25 a signal representative of the position of the valve means; this signal can be sent to the control and operating unit 25 which in turn is arranged to operate the actuator in dependence on the signal received, in accordance with a predetermined program or in accordance with a command preset by the operator.

Preferably, a level indicator 27 is associated with the main tank 9 and sends the control and operating unit 25 a signal representative of the level of the must and of the respective hat inside the main tank 9.

The size and flow-rate of the umbrella-shaped jet of must sprayed onto the hat can thus also be varied in dependence on the level of the must in the main tank.

The control and operating unit may be arranged to program the rectilinear motion of the closure device 17 in any manner so as to adopt the most suitable wine-making process in each individual case. It is possible to perform cycles of wetting of the hat by spraying in order to make the hat heavier, or to vary the size of the jet, directing the jet onto the walls of the main tank 9 or concentrating the jet in the central portion of the hat. The impact of the spray jet on the hat can also be varied by changing from a continuous rectilinear movement of the closure device to a jerky movement, or by varying the times taken to perform each opening and closure cycle or even by varying the speed of the travel of the closure device, when the electromagnetic actuator has this capability.

In general terms, the ability to modulate the jet and the degree of wetting of the hat causes less sediment to be produced, improving the extraction process.

During the first stage of the operating cycle, the main tank 9 is filled to a predetermined level with pressed product, in the upper region of which the hat of marc is formed. The fermentation gas which is evolved in the tank 9 can emerge through the overflow pipe 13 which puts the main tank into communication with the upper tank and hence with the flue 12.

In a second stage, the electric pump 16, operated in a programmed manner by the control and operating unit 25 or by a timer, draws a portion of the liquid must from the lower portion of the tank 9 through the duct 14 and transfers it to the duct 15 in the upper tank 10.

At the same time, the actuator 21 can operate the closure device 17 in order to perform opening and closure cycles which may be predetermined or may be set by the operator as described above.

This stage is followed by complete closure of the closure device 17 whilst the repassing pump 16 continues to transfer some of the liquid must into the upper tank 10. The period for which the pump operates is controlled by the control and operating unit 25 which may be constituted by a timer. During this stage, the overflow pipe 13 enables the must to flow back into the tank 9 in the event of incorrect adjustment of the timer.

When the control unit interrupts the operation of the pump, the closure device 17 is moved to its fully open position by the electromagnetic actuator 21, allowing the must collected in the upper tank 10 to flow out into the tank 9 quickly and turbulently, causing the previously sprayed solid fraction (the hat) to sink and the mass to be homogenized.

In the preferred embodiment, the rod 19 of the closure device 17 is constituted by a tubular body having an opening 23 at its upper end and communicating at its lower end with an opening 22 in the plate 20. The fermentation gases can thus leave the main tank 9 through the openings 22 and 23 and enter the upper tank 10 which communicates with the atmosphere. These characteristics achieve a greater stability of the spray jet which is disturbed to a lesser extent by the excess pressure of fermentation gas contained in the tank 9. Since the opening 23 in the rod 19 is positioned at a level lower than the level of the opening in the overflow device 13, when the tank 10 is completely filled, a partial axial cascade affecting the central portion of the hat of marc is achieved.

FIG. 2 shows a more advanced embodiment of the valve means associated with the base of the upper tank, which enables a variable discharge-flow section to be achieved by progressive opening in two or more stages so that the flow-rate and the orientation of the jet of must can be varied progressively.

In this embodiment, the valve means comprise a first, annular closure member 28 having an annular seal 29 which, in the closure position, engages, in a leaktight manner, the end of the base wall 8 defining the discharge opening 18 of the upper tank 10; the closure member 28 has a central discharge opening 30 and at least one stop member 31 associated with the closure member 28 can cooperate with the base wall 8 of the upper tank 10 in order to define the travel-limit position of the closure member 28.

A second closure member 33 in the form of a plate 33a connected to the rod 17 has an annular seal 32 which engages the central opening 30 in the closure member 28 in the closure position. When the actuator means cause the rod 17 to move downwards, the closure member 28 is opened and a large-radius spray jet is produced; when, as a result of the downward movement of the closure member 28, the stop 31 comes into contact with the walls of the upper tank 10, reaching its travel-limit position, further downward movement of the closure member 33 produces a second, smaller-radius spray jet; it is thus possible to bring about selective or simultaneous opening/closure of the first and second closure members.

It is intended that the first closure member which, in the embodiment shown, has a central discharge opening, may have several discharge openings which, for example, are arranged in sectors and can be engaged and closed by the second closure member 33.

Naturally, the above-described structural principle relating to valve means with two or more closure members with sequential opening may also be applied to a fermentation tank in which the actuator means which operate the valve means are not electrically operated but are operated oleodynamically, pneumatically or, in general, mechanically.

A detector or sensor for detecting the maximum level of the hat of marc in the lower tank may also be associated with the fermentation tank; this detector may, for example be associated with the closure member 20 or 33 and may be able to send a signal to a control and operating unit in order to activate the repassing pump 16 in the event of an excessive increase in the volume of the fermenting mass, in order to prevent pressure on the separator element 8 from below.

It is intended that, although the invention has been described with reference to specific embodiments of the bottom valve and its closure device and in relation to the use of a linear electromagnetic actuator, the structural principle on which the invention is based may also be applied to fermentation tanks in which the valve means and the respective electromagnetically operated actuator means have a different construction.

What is claimed is:

1. A fermentation tank, particularly for plants for making red wine, comprising a main tank for holding the must, an upper tank disposed above the main tank and having a discharge opening in its base, means for periodically supplying a portion of the must from the bottom of the main tank to the upper tank, valve means defining, with the discharge opening of the upper tank, an out-flow aperture the size of which is variable between a closed position and a fully-open position and which can discharge the must from the upper tank to the main tank so as to spray the layer of marc floating on the must held in the main tank, and actuator means associated with the valve means for the opening and closure thereof, wherein the actuator means comprise an electrically operated actuator, a control and operating unit being provided and arranged to define, by means of the actuator means, the position of the valve means and/or the rules governing the opening/closure movement thereof.

2. A fermentation tank according to claim 1, comprising a position detector cooperating with the actuator means in order to send a signal representative of the position of the valve means to the control and operating unit, and in which the control and operating unit is arranged to operate the actuator means in dependence on the signal received.

3. A fermentation tank according to claim 1, comprising level-indicator means arranged to send to the control and operating unit a signal representative of the level of the must and/or the respective hat in the main tank.

4. A fermentation tank according to claim 1, wherein the actuator means are constituted by a cylinder driven by a direct-current electric motor and associated with valve means comprising a closure device movable between a closure position in which it engages the opening in the base of the upper tank and an open position in which it defines, with the opening, an out-flow aperture, and in which the control and operating unit is arranged to impart to the closure device a movement to and fro between two predetermined positions of its opening travel.

5. A fermentation tank according to claim 1, wherein the valve means comprise:
   first closure means which, in their closure position, engage the discharge opening in the base of the upper tank in a leaktight manner, and which have at least one discharge opening,
   second closure means which, in their closure position, engage the discharge opening in the first closure means in a leaktight manner, and in which the actuator means can bring about selective or simultaneous opening/closure of the first and second closure means.

6. A fermentation tank according to claim 5, wherein the first closure means comprise a first annular closure member having at least one discharge opening and an annular valve seat which engages the base walls of the upper tank in a leaktight manner in the closure position and which is movable between the closure position and a fully-open position defined by stop means associated with the annular closure member and cooperating with the walls of the upper tank, and a second closure member with a rod associated with the actuator means and a plate for engaging the discharge opening in the first closure member.

7. A fermentation tank according to claim 1, comprising a device for detecting the maximum level of the liquid/head in the lower tank, optionally associated with the closure member, for sending to the control unit a signal to activate the repassing of the liquid from the lower tank to the upper tank in the event of an excessive increase in the volume of the fermentation mass.

8. A fermentation tank, particularly for plants for making red wine, comprising a main tank for holding the must, an upper tank disposed above the main tank and having a discharge opening in its base, means for periodically supplying a portion of the must from the bottom of the main tank to the upper tank, valve means defining, with the discharge opening of the upper tank, an out-flow aperture the size of which is variable between a closed position and a fully-open position, and which can discharge the must from the upper tank to the main tank so as to spray the layer of marc floating on the must held in the main tank, and actuator means associated with the valve means for the opening and closure thereof, wherein the valve means comprise:
   first closure means which, in their closure position, engage the discharge opening in the base of the upper tank in a leaktight manner, and which have at least one discharge opening,
   second closure means which, in their closure position, engage the discharge opening in the first closure means in a leaktight manner, and in which the actuator means can bring about selective or simultaneous opening/closure of the first and second closure means.

9. A fermentation tank according to claim 8, wherein the first closure means comprise a first annular closure member having at least one discharge opening and an annular valve seat which engages the base walls of the upper tank in a leak tight manner in the closure position and which is movable between the closure position and a fully-open position defined by stop means associated with the annular closure member and cooperating with the walls of the upper tank, and a second closure member with a rod associated with the actuator means and a plate for engaging the discharge opening in the first closure member.

\* \* \* \* \*